(12) United States Patent
Siegel et al.

(10) Patent No.: US 8,206,752 B2
(45) Date of Patent: Jun. 26, 2012

(54) REJUVENATION OF REVERSE OSMOSIS MEMBRANE

(75) Inventors: Gregg Siegel, San Antonio, TX (US); Phyllis Siegel, San Antonio, TX (US)

(73) Assignee: Biomedical Development Corporation, San Antonio, TX (US)

( * ) Notice: Subject to any disclaimer, the term of this patent is extended or adjusted under 35 U.S.C. 154(b) by 786 days.

(21) Appl. No.: 11/581,636

(22) Filed: Oct. 16, 2006

(65) Prior Publication Data

US 2007/0289924 A1    Dec. 20, 2007

Related U.S. Application Data

(63) Continuation-in-part of application No. 11/394,805, filed on Apr. 1, 2006, now abandoned.

(51) Int. Cl.
*A01N 59/12* (2006.01)
*A01N 37/00* (2006.01)
*A01N 43/08* (2006.01)
*A01N 59/00* (2006.01)

(52) U.S. Cl. ........ 424/667; 424/601; 424/613; 424/615; 424/616; 424/660; 424/669; 424/670; 424/671; 514/474; 514/557; 514/574

(58) Field of Classification Search ................. None
See application file for complete search history.

(56) References Cited

U.S. PATENT DOCUMENTS

| 6,838,050 B1 * | 1/2005 | Green et al. | 422/37 |
| 2004/0007255 A1 * | 1/2004 | Labib et al. | 134/30 |

* cited by examiner

*Primary Examiner* — Johann Richter
*Assistant Examiner* — Frank Choi
(74) *Attorney, Agent, or Firm* — John Lezdey

(57) ABSTRACT

A method for rejuvenating a reverse osmosis (RO) membrane which is subject to biofilm and other contaminants in an aqueous system through the use of a free molecular iodine solution at a pH of about 2.2 to 4.0.

10 Claims, No Drawings

REJUVENATION OF REVERSE OSMOSIS MEMBRANE

RELATED APPLICATION

This application is a continuation-in-part of application Ser. No. 11/394,805 to Siegel filed Apr. 1, 2006 now abandoned.

This invention was made with government support under NIH Grant Number R44DK056587 awarded by PHS. The government has certain rights in the invention.

FIELD OF THE INVENTION

The present invention relates to a method of rejuvenating reverse osmosis (RO) membranes which are used in water purification systems. More particularly, there is provided a method for the rejuvenation of reverse osmosis membranes which are subject to biofilm and other contaminants through the use of free molecular iodine.

BACKGROUND OF THE INVENTION

Reverse osmosis (RO) membranes are being utilized in water filtration and purification systems found in households, factories and hospitals. The membranes have sub-microscopic pores that are sized to pass water while rejecting bacteria and other contaminants. A properly designed membrane and system allows only desired molecules to pass through the membrane barrier regardless of the feed stream contaminant level.

As biofilm or other contaminants build up on a membrane system, the system performance will deteriorate. For example, the filtration system may require an increased pressure differential to produce the same flux as the system in its "clean" state. Stated otherwise, for the same level of pressure differential, the flux rate of the system will decrease. For these purposes, the term "pressure differential" or "Delta Pressure" refers to the difference in pressure between the feed stream and the permeate stream, and "flux" refers to the flow rate of the permeate stream. For each cycle between periodic cleanings, the flux will gradually deteriorate over time as biofilm and other contaminants build up on the membrane system. The periodic cleaning will cause the flux level to increase, although typically not to its peak level from the previous cycle because the membrane will generally degrade due to use and, in most circumstances, due to the cleaning process. Thus, in addition to the fluctuations of the system flux between periodic cleanings, there will also be an observed general decline in system performance over time.

Biofilms occur in a wide range of locations. Many are found on or in the human body, including on the teeth, gums, ears, prostate, lungs, and heart, where they are believed to be implicated in chronic infections such as gum disease, ear infections, infections of the prostate gland and heart, and lung infections in people with cystic fibrosis. Biofilms also occur in nature, such as the slime that covers river rocks, marshes, and the like. Biofilms also occur in medical equipment, such as catheters and hemodialysis systems, and are a major source of hospital infections. Biofilms can also occur in areas such as contact lenses, other medical equipment, and in other industries. A primary difficulty with biofilms is that they are more difficult to reduce or eliminate than are individual bacteria. This is due to the formation of the protective layer of slime, as well as adaptations that the individual bacteria undergo when they form biofilms.

One important area in which biofilms occur is in aqueous systems that use separation membranes, such as particle filtration, microfiltration, ultrafiltration, nanofiltration, and particularly reverse osmosis (RO) systems. Microfiltration membranes are typically polymer or metal membrane disc or pleated cartridge filters rated in the 0.1 to 2 micron range that operate in the 1 to 25 psig pressure range. Ultrafiltration is a crossflow process that rejects contaminants (including organics, bacteria, and pyrogens) in the 10 angstrom to 0.1 micron range using operating pressure in the 10 to 100 psig range. Nanofiltration equipment removes organic compounds in the 200 to 1,000 molecular weight range rejecting selected salts. Reverse osmosis removes virtually all organic compounds and 90 to 99% of all ions under pressure in the 200 to 1000 psig range.

These systems use membranes to selectively remove or separate extremely small substances from water and process streams in residential, commercial, and industrial applications. When biofilm is present on the membrane due to microbial growth, colloidal solids and insoluble precipitates can adhere to the sticky substance. As this combination builds, water transmission rates through the membrane are reduced and/or additional pressure must be applied to maintain the same water transmission rates. Colloidal solids, microbiological growth and insoluble precipitates can collect on the membrane during operation. Conventional treatment methods include continuous dosing, in which a residual level of a biocidal agent is maintained within the system, or periodic cleaning and sanitization, in which the filtration system is shut down for a periodic cleaning and sanitization using biocidal agents, acids and caustics. Even with continuous dosing methods, at some point the filtration system must be shut down so that the membrane can be cleaned or replaced. This results in downtime and consequent additional operating expense. Moreover, the cleaning and biocidal agents and caustics that are conventionally used to clean and sanitize the filtration systems have the effect of degrading the filter membranes, which are typically comprised of polymers such as cellulose acetate or polyamide polymers. A number of treatment processes are also available to reduce the fouling potential of the feed water being introduced to the membrane. These include various types of filtration, disinfection, and chemical treatment. Even with these methods, however, most RO treatment systems must be cleaned regularly.

More information about biofilms is provided in an article entitled "sticky Situations: Scientists are Beginning to Understand How Bacteria Find Strength in Numbers" by Jessa Netting, published in Science News, 60:28-30, Jul. 14, 2001, which is hereby incorporated by reference herein in its entirety.

The majority of hemodialysis centers in the United States are equipped with reverse osmosis systems that operate with thin film composite membranes. Thin film composite membranes are susceptible to oxidation with certain disinfection chemicals such as chlorine. The use of chlorine will cause hydrodysis of the membrane and thus the membranes will lose their ability to reject minerals, bacteria and pyrogens. The current acceptable disinfectants for these membranes is RENALIN®, glutaraldehyde and formaldehyde, all of which are difficult to handle and are believed to be carcinogenic.

In municipal water thin film composite membranes are installed in reverse osmosis systems to reduce the total dissolved solids and to remove 99.99 percent of the bacteria and pyrogens. The water quality must meet AAMI standards.

U.S. Pat. No. 6,699,391 to Baldridge et al discloses a method for decreasing the growth of biofilm on reverse osmosis membrane utilizing enzymes.

U.S. Pat. No. 6,180,056 to McNeel et al discloses a method of controlling fouling of a reverse osmosis membrane through the use of an anionic antiscalant and a cationically charged biocide.

Application Ser. No. 11/394,805 to Siegel which is herein incorporated by reference discloses compositions for treating biofilm in medical lines which compositions release at least 80 ppm of free molecular iodine that can be used in the present invention.

SUMMARY OF THE INVENTION

The present invention provides a method for rejuvenating reverse osmosis (RO) membranes comprising an aqueous solution containing an effective amount of a monobasic iodide salt, an effective amount of an organic acid having up to eight carbon atoms, an effective amount of at least one oxidizing agent and a buffer, preferably a phosphate buffer, which can be incorporated in mouth washes or tooth cleaning preparations. More particularly, the present composition comprises a monobasic iodide salt which is an alkali metal salt, preferably sodium, calcium, magnesium or potassium iodides in an amount of at least about 0.01 to 0.5% by weight, more preferably about 0.01 to 0.1%, an organic acid having up to eight carbon atoms, preferably selected from the group consisting of succinic acid, citric acid, ascorbic acid, and oxalic acid or the salts thereof in an amount of about 0.1 to 1% by weight, preferably 0.1 to 0.5%, an oxidizing agent and a buffer.

The oxidizing agent is preferably the alkali metal salt of a per acid or urea hydrogen peroxide which is present in an amount of at least about 0.01 to 1.0% by weight or other oxidizing agents. The composition should have an available iodide of at least 300 ppm, preferably about 400 to 600 ppm.

The composition is buffered to a pH of 2.2 to 4.0, preferably 3.0 to 3.5.

It is a general object of the invention to provide a composition for rejuvenating reverse osmosis membranes used in aqueous systems.

It is a further object of the invention to provide a composition which can be added to a water circulating system to rejuvenate RO membranes.

It is a further object of the invention to provide systems and methods for improving the performance of aqueous systems that use separation membranes, thus enhancing the separation process of such systems.

It is a still further object of the invention to provide systems and methods for reducing biofilm and other fouling agents in cross flow filtration systems, thus enhancing the filtration process.

It is a still further object of this invention to provide improved aqueous filtration systems and methods that use iodine to reduce fouling of filtration membranes.

It is yet another object of the invention to remove biofilm from hemodialysis membrane by treating the membrane with a composition comprising 300 to 600 ppm of molecular free iodine at a pH of about 2.2 to 4.0.

It is yet another object to provide a composition which can rejuvenate household purification systems containing RO membranes.

It is another object of the invention to provide a method for rejuvenating RO membranes in hemodialysis systems.

DESCRIPTION OF THE PREFERRED EMBODIMENTS

In accordance with the present invention there is provided an aqueous composition that can be used in an aqueous system to rejuvenate fouled reverse osmosis membranes and other water filtration membranes which comprises:

A. an effective amount of a monobasic iodide salt to provide at least 300 ppm of available iodine to said composition, preferably about 400 to 600 ppm B. An organic acid having up to eight carbon atoms;

C. An oxidizing agent, preferably an alkali salt of a per acid or urea hydrogen peroxide;

D. A buffer which if desired can include the organic acid of part B to provide a pH of about 2.2 to 4.0, and;

E. Water.

The composition is also anti-microbial so that it not only kills pathogens but also removes the biofilm caused by the pathogens. The composition is effective against a wide variety of various aerobic, anaerobic and facultative species, including *Candida albicans, S. aureas, T. denticola, P. intermedia, cectinomyces, viscosus, P. gingivalis, S. sangrias, S. mutans, A. viscosus* and *A. naeslundii.*

In general, the acid necessary to supply the required pH to the overall composition can be any organic or inorganic acid which does not chemically react with the other components, such as hydrochloric acid, phosphate salts, phosphoric acid, sulfuric acid, citric acid, acetic acid, preferably the organic acids or phosphate salts such as calcium pyrophosphate. The operating pH range for the composition is 2.3 to 4.0 and preferably, from about 3.0 to 3.5. The pH of an aqueous solution comprising the above enumerated components of the invention is determined by employing an aqueous solution of 0.5%, by weight, total of active components typically at a glass electrode, to precisely define the acidity of the composition.

In practice, the amounts of each of the components of the overall composition can range widely from 0.009 part to 40.0 parts by weight depending upon use. The pH of the total composition is then adjusted to the requisite pH by adding a suitable inorganic or organic acid thereto. The critical percent is to maintain an available iodine content of at least 300 ppm, preferably 400 to 600 ppm. The lower pH has the greater amount of iodine parts per million.

A preferred composition of the invention consists of:

1) at least about 1 to 5% by weight of a monobasic iodide salt which is an inorganic metal salt, preferably an alkali metal salt, for example sodium iodide, sodium pentaiodide, potassium iodide, calcium iodide and the like;

2) about 10 to 20% by weight of an organic acid having up to eight carbon atoms, more particularly selected from the group consisting of succinic acid, citric acid, ascorbic acid, oxalic acid, and the alkali salts thereof;

3) about 0.2 to 5% by weight of an oxidizing agent selected from the group consisting of alkali salts of peroxide, sodium percarbonate, sodium perborate, urea hydrogen peroxide, peroxidase, ascorbic acid, and citric acid;

4) about 5 to 15% by weight of a buffer, which is preferably a phosphate buffer and the remainder 5) water, said composition having a pH of about 2.2 to 3.5.

The method of the invention relates to treating a fouled membrane in a circulating system, preferably one with a cross flow for a period of time while maintaining a pH of 2.2 to 4.0, preferably 2.2 to 3.5.

For hemodialysis membranes the cleaning solution is recirculated for a minimum of 1. to 1.5 hours at the following flow rate.

| Element Diameter (Inches) | Flow Rate Per Vessel GPM (LPM) |
|---|---|
| 4 | 10 (38) |
| 6 | 23 (87) |
| 8 | 40 (151) |

The total time for treating the membranes depends on the amount of fouling. The membranes may be soaked overnight and then rinsed by re-circulating rinse water, particularly for household RO membranes.

The following Examples are illustrative of the invention.

EXAMPLE 1

A preferred composition of the invention is prepared by admixing the following:

| Ingredient | % w/w |
|---|---|
| Purified Water, USP | 71.3375 |
| Potassium Phosphate Monobasic, NF | 10.00 |
| Citric Acid Anhydrous, USP | 15.8 |
| Sodium Iodide, USP | 2.45 |
| Sodium Perborate Monohydrate | 0.4125 |

The pH of the composition is about 2.3 to 4.0.

EXAMPLE 2

| Ingredient | Wt. % |
|---|---|
| Sodium Pentaiodide | 1.0 |
| Citric Acid | 10.0 |
| Sodium Percarbonate | 0.2 |
| Potassium Phosphate | 5.0 |
| Water | q.s. |

The composition can be used to treat household filters by soaking overnight and then rinsing.

EXAMPLE 3

The following study was performed to determine whether the use of the compositions of the invention would oxidize a thin film composite membrane or cause a loss of flux.

Method:

An eight inch diameter RO membrane which had been fouled and weighted eleven pounds ten ounces (5.26 kg) whose normal weight was nine pounds two ounces (4.14 kg) was placed in a stainless steel tank (50 gal.) in which there was re-circulated a 50:1 dilution of the active ingredients of Example 1 in water. The solution was re-circulated every 15 minutes for one hour at a flow rate of 400 GPM. The pH and iodine were tested and the results were as follows:

| Time | pH | Iodine (ppm) |
|---|---|---|
| 1.45 | 3.18 | 278.4 |
| 2.00 | 3.72 | 66.8 |
| 2.15 | 3.79 | 30.2 |
| 2.45 | 3.85 | 14.3 |
| 3.15 | 3.89 | 11.1 |

After 1.5 hr. treatment the weight of the membrane was reduced to nine pounds fourteen ounces (4.47 kg). The process was continued by rinsing with water. The rinsing removed substantially all of the contaminants.

EXAMPLE 4

Results of RO performance, as shown in the following table, indicate that compositions of the invention does not adversely affect RO product TDS:

| (2000 ml/min.) | Non-Treated Baseline Day 1 | Overnight Treatment Day 2 |
|---|---|---|
| RO Product Flow Rate | .55 gpm (2100 ml/min) | .52 gpm |
| RO Reject Flow Rate | 3.33 gpm | 3.33 gpm |
| Feed TDS | 390 ppm | 390 ppm |
| RO Product TDS | 10 ppm | 10 ppm |
| RO Reject TDS | 450 ppm | 450 ppm |
| Reject Pressure | 55 psi | 60 psi |
| Feed Pressure | 40 psi | 42 psi |

Conclusions

The composition appears to greatly improve the performance of used, fouled RO membranes and has potential for commercial application in this area. When treating new membranes the composition does not appear to adversely affect the performance of the RO membrane.

EXAMPLE 5

The following study was performed on a PUR® reverse osmosis system in which the indicator had signaled replacement cartridge.

The purifying cartridge was placed into a tank containing the composition of Example 2 for a one week period. After one week the cartridge was rinsed and returned to the RO system.

The results were as follows:

| Time | Iodine | pH |
|---|---|---|
| Initial | 372 ppm | 3.42 |
| One day | 4.81 ppm | 3.54 |

The cartridge when returned to the RO system after rinsing was stabilized and the feed pressure was returned to normal.

EXAMPLE 6

A 100 ml composition of the present invention comprises admixing the following:

| Ingredient | Wt. |
|---|---|
| Sodium Iodide | 1.0-2.00 g |
| Citric Acid | 5.0-10.0 g |

-continued

| Ingredient | Wt. |
| --- | --- |
| Sodium Perborate | 0.4-1.0 g |
| Sodium Carbonate | 0-0.05 g |
| 1% Saline Solution | q.s. |

The salts may be dissolved in sterile water, saline solution or buffer solution with a pH of 2.3 to 4.0. For example, the preferred formulation for borax buffer is as follows:

Solution A-1 g $Na_2P_4O_7$ per 100 ml of $H_2O$.

Solution B-1.25 g $H_3BO_3$+0.3 g NaCl pr 100 ml $H_2O$) is mixed with Solution A and the salts are added. The mixture is then added to the composition to obtain the desired pH.

The composition can be used by applying directly into a re-circulating vessel.

What is claimed is:

1. A method for rejuvenating a reverse osmosis membrane having biofilm and other contaminants in an aqueous system so as to improve the flux rate which comprises treating said system with a composition comprising
   A) an effective amount of a monobasic iodide salt to provide available free molecular iodine to said composition;
   B) an organic acid having up to eight carbon atoms;
   C) an oxidizing agent,
   D) a buffer, and
   E) water,
said composition having a pH of about 2.2 to 4.0 and available free molecular iodine of 400-600 ppm, and introducing said compositions into an aqueous system containing said membranes for a period of time to reduce contaminants and biofilm and then rinsing the membrane.

2. The method of claim 1 wherein said organic acid is selected from the group consisting of succinic acid, citric acid, ascorbic acid oxalic acid or the alkali salts thereof, and said iodide salt is selected from the group consisting of sodium and potassium.

3. The method of claim 1 wherein said oxidizing agent is selected from the group consisting of the alkali salt of a peracid, peroxidase, alkali salts of peroxide and urea hydrogen peroxide.

4. The method of claim 3 wherein said oxidizing agent is selected from the group consisting of sodium percarbonate and sodium perborate.

5. The method of claim 1 wherein said buffer is a phosphate salt.

6. The method of claim 1 wherein said composition has a pH of 2.3 to 3.5.

7. The method of claim 1 wherein said aqueous system is a cross flow filtration system.

8. The method of claim 1 wherein 100 ml of said composition used for a hemodialysis membrane consists essentially of:

| Ingredient | % w/w |
| --- | --- |
| Water | 71.3375 |
| Potassium Phosphate Monobasic | 10.00 |
| Citric Acid | 15.8 |
| Sodium Iodide | 2.45 |
| Sodium Perborate | 0.4125 | and the composition is recirculated at a dilution of 50:1 of water.

9. A method for removing biofilm from a hemodialysis membrane so as to improve the flux rate which comprises treating said membrane in an aqueous medium with a composition containing 400 to 600 ppm of molecular free iodine at a pH of 2.2 to 4.0 in a cross flow filtration system.

10. The method of claim 9 in which water is recirculated to rinse the membrane.

* * * * *